United States Patent
Lim et al.

(10) Patent No.: US 11,561,704 B2
(45) Date of Patent: Jan. 24, 2023

(54) ARTIFICIAL INTELLIGENCE (AI) ASSISTED ANOMALY DETECTION OF INTRUSION IN STORAGE SYSTEMS

(71) Applicant: Seagate Technology LLC, Cupertino, CA (US)

(72) Inventors: Hock S. Lim, Singapore (SG); Yuen L. K. Ho, Singapore (SG); Asif H. Khan, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 405 days.

(21) Appl. No.: 16/729,133

(22) Filed: Dec. 27, 2019

(65) Prior Publication Data
US 2021/0200450 A1    Jul. 1, 2021

(51) Int. Cl.
*G06F 3/06* (2006.01)
*G06F 21/55* (2013.01)
*G06N 20/00* (2019.01)

(52) U.S. Cl.
CPC .......... *G06F 3/0622* (2013.01); *G06F 3/0653* (2013.01); *G06F 3/0659* (2013.01); *G06F 3/0673* (2013.01); *G06F 21/554* (2013.01); *G06N 20/00* (2019.01); *G06F 2221/034* (2013.01)

(58) Field of Classification Search
CPC ..... G06N 20/00; G06F 21/554; G06F 3/0622; G06F 3/0659; F06F 3/0673
See application file for complete search history.

(56) References Cited

U.S. PATENT DOCUMENTS

| | | | |
|---|---|---|---|
| 7,793,138 B2 | 9/2010 | Rastogi et al. | |
| 8,683,591 B2 | 3/2014 | Wittenschlaeger | |
| 10,254,991 B2 | 4/2019 | Bharadwaj | |
| 10,372,524 B2 | 8/2019 | Shivaji et al. | |
| 11,010,233 B1 * | 5/2021 | Golden | G06F 21/64 |
| 2003/0188189 A1 | 10/2003 | Desai et al. | |
| 2014/0165056 A1 * | 6/2014 | Ghai | G06F 11/1484 718/1 |
| 2021/0035556 A1 * | 2/2021 | Shen | G06K 9/6256 |

FOREIGN PATENT DOCUMENTS

JP             6329333 B1 *  5/2018  ............. G06F 12/14

* cited by examiner

*Primary Examiner* — Matthew Smithers
*Assistant Examiner* — Shu Chun Gao
(74) *Attorney, Agent, or Firm* — Holzer Patel Drennan

(57) ABSTRACT

Artificial intelligence (AI) anomaly monitoring in a storage system. The AI anomaly monitoring may include writing commands into a log jointly with the execution of the commands on storage media of a drive. The log includes information regarding the operation of the drive including, at least, the commands. In turn, each drive in the storage system may include an AI processor core that may access the log and apply an AI analysis to the log to monitor for an anomaly regarding the operation of the drive. As each drive in the storage system may use the AI process core to detect anomalies locally to the drive, the computational and network resources needed to employ the AI monitoring may be reduced.

17 Claims, 8 Drawing Sheets

ARTIFICIAL INTELLIGENCE (AI) ASSISTED ANOMALY DETECTION OF INTRUSION IN STORAGE SYSTEMS

BACKGROUND

Digital data security relates to the protection of data both in transit and at rest in computer systems. With the growing prevalence of cloud computing paradigms and the sensitivity of applications employing cloud computing paradigms, digital data security is of utmost importance to individuals, governments, businesses, or any other entity that generates, communicates, stores, or otherwise maintains digital data regardless of the location of such data.

One approach to digital data security involves anomaly detection in storage devices. Previously contemplated approaches to anomaly detection rely on a rule-based approach for the detection of anomalies in which rote rule-based conditions are established and utilized to monitor for anomalies. Such rule-based anomaly detection is only useful for the most naive of attacks and is usually limited to only looking for obvious patterns related to malicious activity. In turn, bad actors seeking unauthorized access to storage devices may craft attacks that are not detectable by such rule-based anomaly detection. In turn, further improvements to anomaly detection are needed to provide further safeguarding of digital data in storage systems by providing more robust anomaly detection.

SUMMARY

In view of the foregoing, the present disclosure generally relates to improved anomaly detection for storage systems. In particular, the present disclosure utilizes artificial intelligence (AI) through machine learning (ML) models employed at each drive in a storage system to detect anomalies locally at each drive. Specifically, computational resources (e.g., a local processor and memory) of each drive are leveraged to employ an AI analysis regarding the operation of the drive.

In particular, the present disclosure includes receiving I/O commands at a storage controller of a storage drive. The storage controller is located locally on the storage drive. Input/output (I/O) commands are executed on the storage drive using the storage controller. Additionally, a log regarding operations of the storage drive at least including the I/O commands is written into a local memory of the storage drive. Furthermore, an artificial intelligence (AI) processor core accesses the log to execute an AI analysis on the log to monitor for an anomaly related to the operations of the storage drive, the AI processor core located locally to the storage drive.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
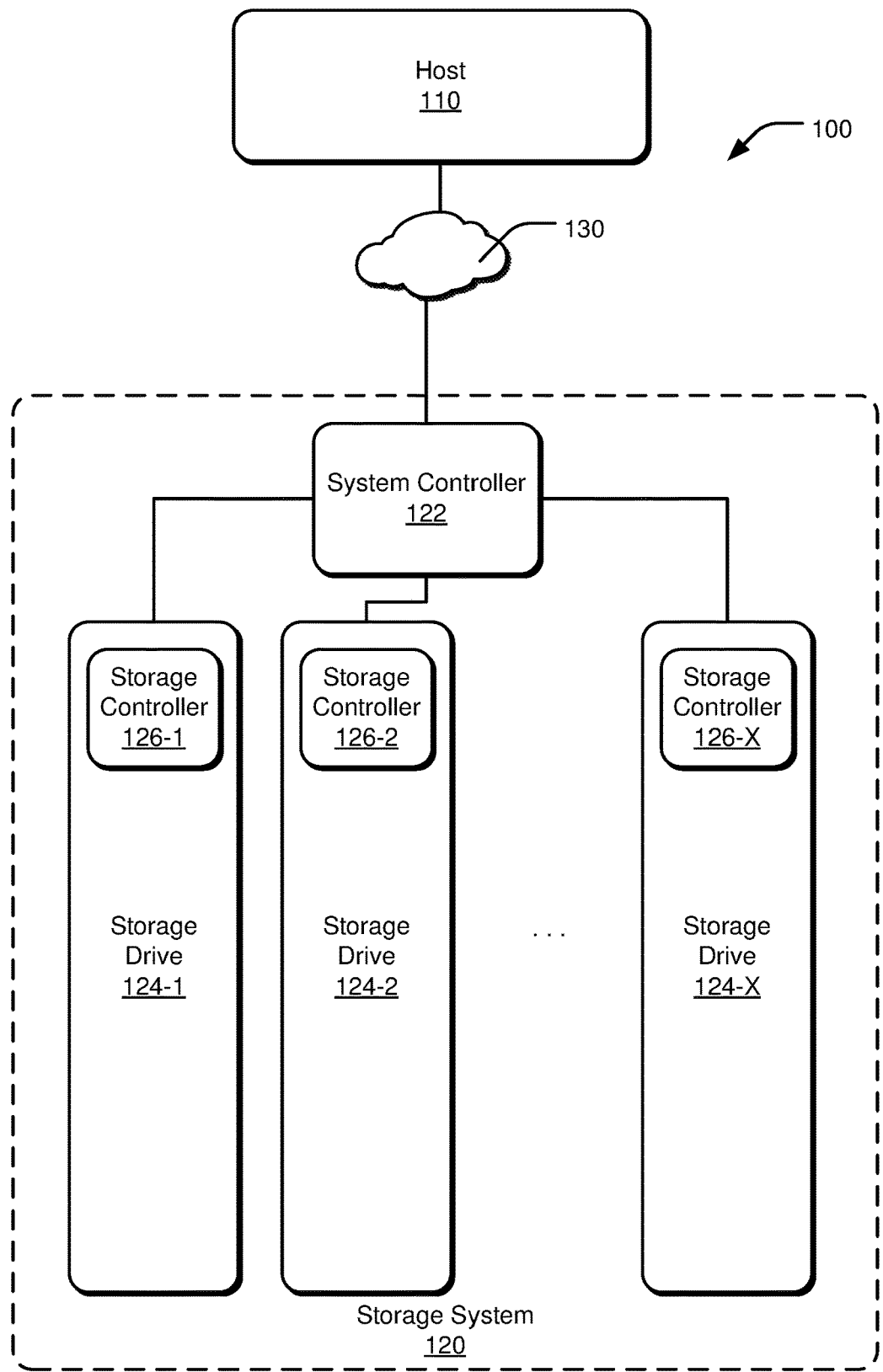
FIG. 1 illustrates an example storage system architecture in which AI anomaly monitoring may be performed.

Storage systems are used in a wide variety of applications for nonvolatile data storage. Such storage systems may include multiple storage drives that may coordinate to provide large, long term storage solutions. In many cases, but not necessarily, storage systems utilize network resources to facilitate communication with storage drives and/or between a host device and the storage system.

Regardless of the application, data security of data stored in the storage system is an important consideration. In this regard, anomaly detection is desirable to assist in the detection of malicious access and/or activity of the storage system. As briefly described above, proposed solutions to anomaly monitoring and detection include rule-based monitoring in which rote rule-based conditions are established and utilized to monitor for anomalies. As described above, such approaches are extremely limited in the type of malicious activity that may be detected. In turn, solutions based in artificial intelligence (AI) may be used in connection with anomaly monitoring of a storage system. AI solutions may be capable of performing machine learning of nominal operation of a storage system such that anomalies from the nominal operation may be detected without the limitations related to rule-based approaches that rely on rote rules.

However, the use of AI to monitor storage systems may present novel challenges for the efficient implementation of an AI monitoring solution. As indicated above, storage systems often include a plurality of drives such that a system controller may coordinate the operation of the plurality of drives to present one or more logical volumes of storage to a host device. The use of a plurality of drives provides notable advantages that include the potential for data redundancy (e.g., through the use of RAID arrays or the like). However, communication with the plurality of drives often occurs over network resources such that considerations related to data bandwidth for data exchange between a system controller and the storage drives in the system.

Further still, AI analysis of the operations of the plurality of drives in the storage system may utilize significant processing capacity to analyze the large quantity of data that may be produced in view of the plurality of storage drives in a storage system. For example, storage systems may include storage drives that number in the dozens or hundreds. If operational information (e.g., logs or the like) from each of these drives were communicated via a network to an AI processor, the network bandwidth and processing resources scale with the number of drives in the system. In turn, even for moderately sized systems, the required network and computational bandwidth required to monitor the plurality of storage drives effectively becomes infeasible.

In view of the foregoing, the present disclosure generally relates to distributed AI anomaly monitoring for a storage system. Specifically, the present disclosure presents storage drive configurations that allow for AI anomaly detection to be performed independently at each storage drive in a storage system. In this regard, the obstacles regarding networking bandwidth and aggregated processing requirements are mitigated. The distributed AI anomaly monitoring described herein facilitates individual drives in the storage system to locally monitor operations using a robust AI monitoring approach that does not require migration of operational data such as logs from the storage drive. Furthermore, the amount of data to be analyzed is relatively granular as the local drive operation is monitored, thus allowing lighter-weight processing capability to be utilized. In turn, in at least some applications, existing memory and processing resources provided on storage drives without AI monitoring may be leveraged to provide AI monitoring. In turn, AI anomaly monitoring may be facilitated with no or minimal additional resources at each storage drive, which facilitates an economical solution to deploy the AI anomaly monitoring even in storage systems that are very large or in which massive scaling is envisioned.

With reference to FIG. 1, an example storage architecture 100 is shown in which distributed AI anomaly monitoring may be employed. The storage architecture 100 includes a storage system 120. The storage system 120 may be in operative electronic communication with a host 110. For example, the host 110 may communicate with the storage system 120 via a network 130. The network 130 may be any network type and/or configuration, including a wired, wireless, publicly switched telephone network (PSTN), intranet, the Internet, local area network, wide area network, or the like.

The storage system 120 may include a system controller 122. The system controller 122 may receive commands (e.g., input/output (I/O) commands) from the host 110. In turn, the system controller 122 may direct the operation of a plurality of storage drives 124-1, 124-2 . . . 124-X. The storage drives 124 may include any number of storage drives 124 without limitation. Moreover, the storage system 120 may be scalable such that storage drives 124 may be added or removed from the storage system 120 without limitation.

While not shown explicitly in FIG. 1, the system controller 122 may be in operative communication with each respective drive 124 via network communications. That is, the system controller 122 may be remote from one or more of the storage drives 124. In turn, communication between respective ones of the storage drives 124 and/or between a storage drive 124 and the system controller 122 may be by way of network communication including any of the network configurations described above in relation to network 130.

The system controller 122 may facilitate virtualization of the storage resources provided by the storage drives 124. For example, the system controller 122 may implement a RAID scheme for storage of data among the various storage drives 124. As such, the storage controller may be operative to define one or more logical volume or logical unit numbers (LUNs). In turn, the LUNs may be presented to the host 110 as available storage resources. The system controller 122 may additionally or alternatively facilitate other virtualization or mapping to provide a translation of logical addresses to physical addresses in the storage drives 124. The system controller 122 may also facilitate other storage system 120 functions for operations related to the plurality of storage drives 124. In addition, each storage drive 124 may include a corresponding storage controller 126. That is, drive 124-1 includes storage controller 126-1, drive 124-2 includes storage controller 126-2, drive 124-X includes storage controller 126-X, and so on. Each storage controller 126 may facilitate the operation of individual functions at each respective drive 124 as will be described further with reference to FIG. 2.

Figure 2:
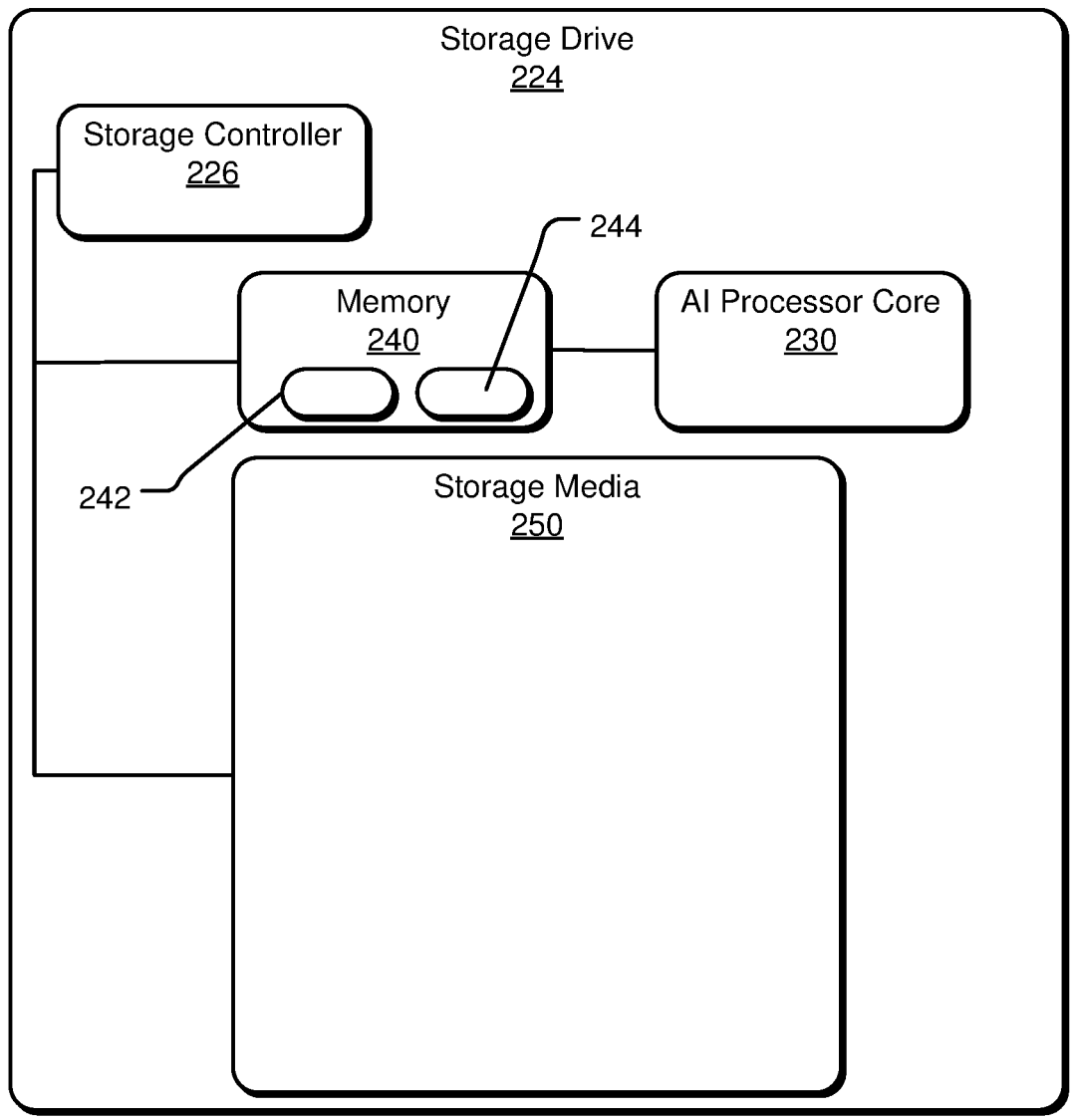
FIG. 2 illustrates an example storage drive in which AI anomaly monitoring may be performed.

FIG. 2 shows an example of a storage drive 224. A storage controller 226 may facilitate control over operations of the storage drive 224. For example, the storage controller 226 may receive I/O commands from a system controller 122 and/or host 110 for the execution of read, write, or erase operations and/or other memory operations at the drive 124. Accordingly, the storage controller 226 may be in operative communication with storage media 250 of the storage drive 224. The storage media 250 may include any one or more types of storage media without limitation that may include, but is not limited to, a solid-state drive (SSD), hard disc drive (HDD), serial advanced hybrid (SATA) drive, serial attached SCSI (SAS) drive, flash drive, optical disc drive, magnetic disc drive, magnetic tape drive, and/or solid-state hybrid drive (SSHDs).

The storage controller 226 may issue commands (e.g., I/O commands) to the storage media 250 to facilitate the execution of the commands on the storage media 250. In addition, the commands may be written to a log 242 in a local memory 240 of the storage drive 224. In turn, the log 242 stored in the memory 240 may reflect the operation of the storage drive 224 including, at least, the I/O commands executed on the storage media 250. In this regard, the storage drive 224 may include a "T-ed" configuration in which commands are both executed on the storage media 250 and stored in the log 242 in the local memory 240. Storage of the commands in the log 242 may thus be jointly executed and stored in the log 242. This may include, but does not require, concurrent operation of the execution of a command and writing of the command in the log 242. That is, the execution and writing operations may occur simultaneously or may occur in at least partially non-overlapping time periods.

In an example, the local memory 240 includes random access memory (RAM) such as, for example, dynamic RAM (DRAM). The log 242 may include a circular buffer in which the most recent operations are stored in the log 242 such that the oldest operations stored in the log 242 are overwritten with new operations received from the storage controller 226. In an example configuration, log 242 comprises 500-600 MB of dedicated storage capacity in the local memory 240 that is configured as a circular buffer for storage of operational data including the I/O commands.

The memory 240 also includes a machine learning (ML) model 244 stored in the memory 240. The ML model 244 may include a trained ML model that relates to the nominal operation of the storage drive 224. The ML model 244 may be dynamically generated based on the actual operation of the storage drive 224 or may comprise a pre-trained ML model that is stored in the memory 240.

The storage drive 224 also includes an AI processor core 230. The AI processor core 230 is in operative electronic communication with the memory 240. In turn, the AI processor core 230 may access both the ML model 244 and log 242. The AI processor core 230 applies the ML model 244 to the log 242 to monitor for anomalies. Various AI approaches to facilitate such anomaly detection are discussed below by way of example and not limitation. That is, any appropriate AI approach and/or ML model may be utilized without limitation.

In relation to a pre-trained ML model 244, the model 244 may be specially trained and/or otherwise configured in particular relation for a particular application or context in which the storage drive 224 is deployed. For example, storage systems may be deployed in particular contexts which may have a particular nominal operational signature reflected in the ML model 244. For example, a surveillance storage system may have different nominal operation characteristics than a data center network data storage system. These examples are intended to be illustrative and non-limiting. Accordingly, regardless of the specific context of the storage system, the ML model 244 may be specially adapted for the context of the storage system in view of the potential differences in nominal operational characteristics of storage systems deployed in such various contexts.

As depicted in FIG. 2, the AI processor core 230 may be a discrete processor from any processing capacity of the storage controller 226. In this regard, the AI processor core 230 may be securely isolated from the storage controller 226. However, other configurations may be realized that realize such secure isolation.

Figure 3:
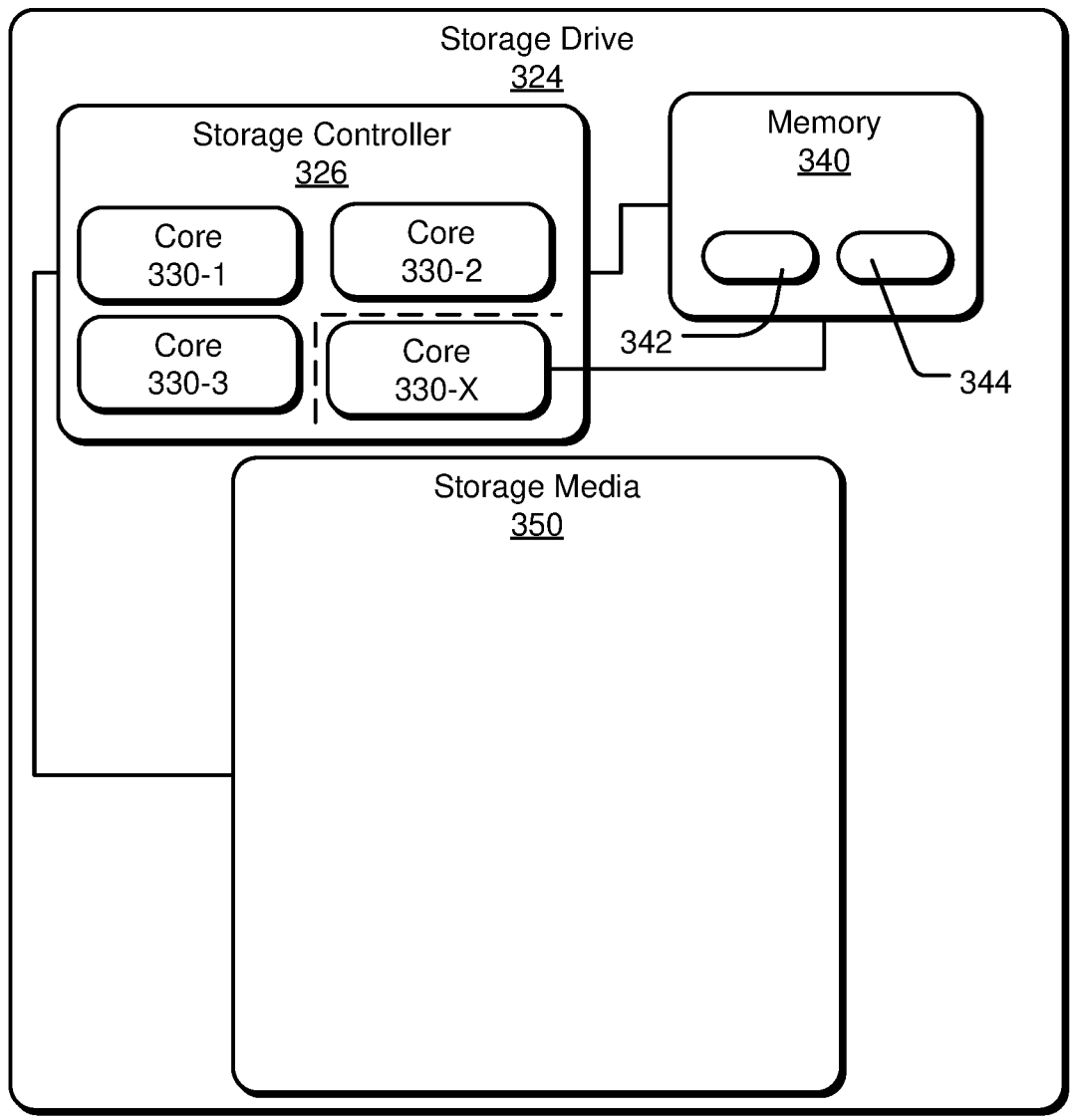
FIG. 3 illustrates another example storage drive in which AI anomaly monitoring may be performed.

For example, FIG. 3 depicts another example of a storage drive 324. The storage drive 324 includes a storage controller 326 that may execute commands on storage media 350 and write into a log 342 of a local memory 340 as described above in relation to FIG. 2. The local memory 340 may also include an ML model 344 as described above. However, rather than having a discrete AI processor core, the storage controller 326 may include a multi-core processor that includes, as schematically depicted, a plurality of cores including core 330-1, core 330-2, core 330-3, and core 330-X. It may be appreciated that any number of cores 330 may be provided without limitation. One or more of the plurality of cores of the storage controller 326 may be dedicated as an AI processor core. For example, in FIG. 3, core 330-X is dedicated as the AI processor core. As illustrated, the dedicated one or more AI processor core 330-X may be securely isolated from the other cores 330-1 through 330-3 of the storage controller 326. For example, data communicated with and/or processes conducted on the AI processor core 330-X may be encrypted to avoid detection and/or manipulation. Such encryption may be different to any other security protocols conducted for the remaining cores 330-1 through 330-3 such that even if a malicious actor may attain access to the other cores 330-1 through 330-3, the AI processor core 330-X may be securely isolated such that any anomalous behavior of the storage drive 324 may still be detected.

As noted above, an AI processor core, according to any example described herein, may access an ML model from memory for operation of the AI analysis of drive operation. Any one or more appropriate ML model and AI analysis may be utilized for anomaly monitoring and detection. In one particular example, a recurrent neural network (RNN) may be utilized to monitor for anomalies on a storage drive. Specifically, a long short-term memory (LSTM) RNN may be suited for the analysis of the time series data corresponding to a log regarding storage drive operations. Such an RNN-LSTM has the ability to incorporate behavior into a network by training with normal data regarding nominal operation. Such nominal operation may be defined in relation to the pre-trained ML model referenced above, which may be generated using a controlled example storage drive operating in a particular context of the drive to be monitored. That is, the ML model may be generated under nominal controlled conditions of a drive operating in a specific context to define the nominal operation of a storage drive against which actual operations are compared using the AI processor core for anomaly monitoring and detection. The ML model may include appropriate weighting parameters based on the training data provided in nominal drive operation. In the case of a pre-trained ML model that is stored in the local memory of a drive as described above, authentication may be required to update and/or modify the ML model once provided in the memory. In this regard, the AI processor core may monitor for clustering or other anomalous commands and/or events from the log written into the local memory.

Additional and/or alternative ML and/or AI approaches may also be utilized without limitation. For example, other supervised or unsupervised ML approaches may be utilized to generate an ML model. Such models may define a Single Class Classifier in which normal or nominal operation is a single class and any outliers are deemed an anomaly. A Multi-Class Predominantly Normal usage pattern may be trained which may require only a small finite number of labeled "normal" commands and/or command sequences to define the normal or nominal operation. In this regard, anomalous behavior need not be labeled in the training data as any activity varying from the normal training data may be flagged as a detected anomaly. Furthermore, in at least some examples, log data generated by a drive during operation may trigger an anomaly detected. If upon investigating the flagged anomaly, it is found to correspond to normal operation, such activity flagged as anomalous by the AI processor core may be labeled as normal and provided as additional training data in the ML model. Other models from those described above may be used without limitation including K-means clustering, support vector machine (SVM), and/or gated recurrent unit (GRU).

Figure 4:
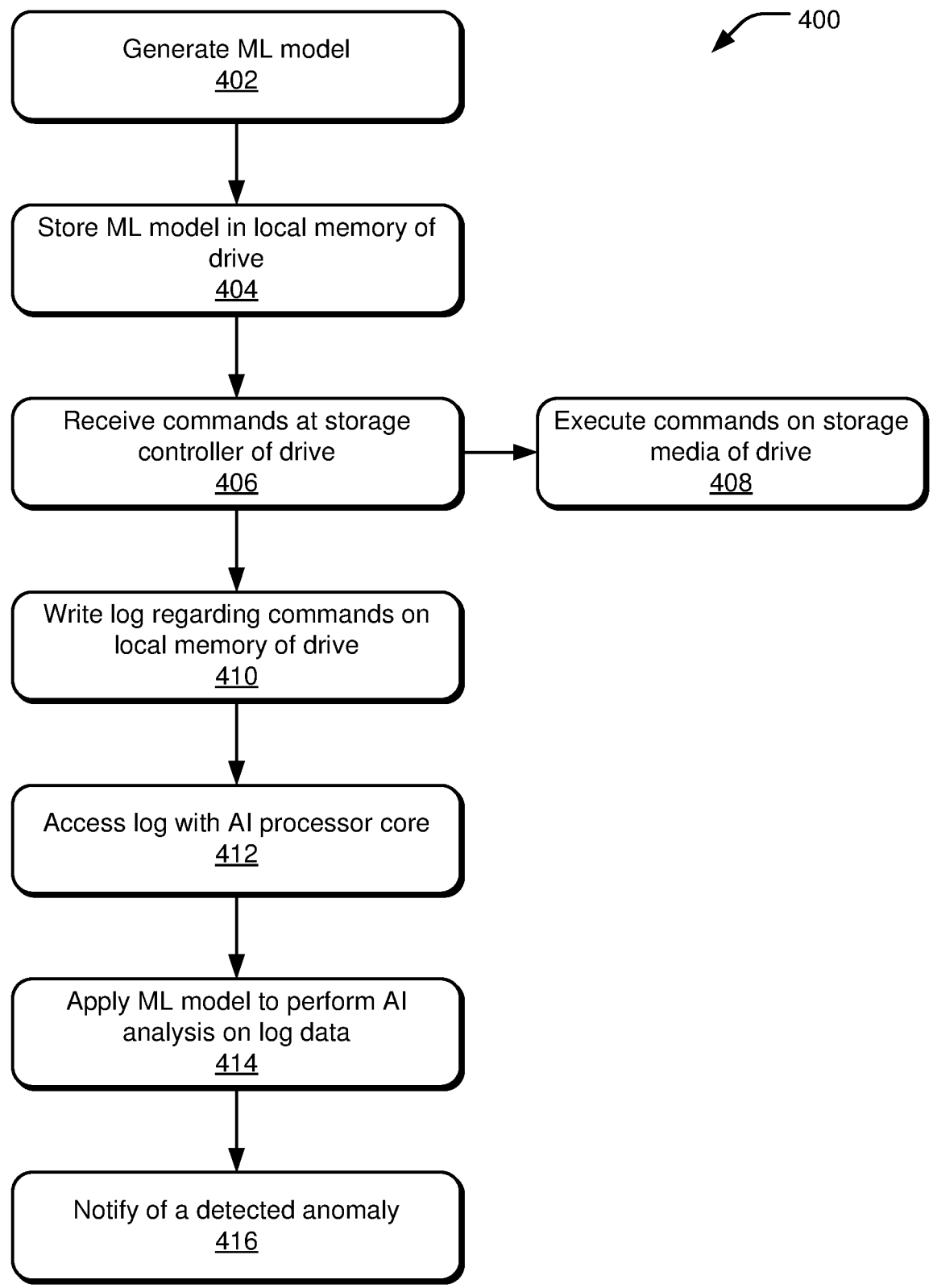
FIG. 4 illustrates example operations for AI anomaly monitoring and detection in a storage system.

With further reference to FIG. 4, example operations 400 for the operation of a storage drive for anomaly detection using AI are depicted. The operations 400 include a generating operation 402 in which an ML model may be generated. As described above, this generation may be based on nominal operations of a storage drive. Training data for nominal operations may be provided by a sandboxed or otherwise protected drive to ensure that the training data corresponds to nominal operations not including or influenced by malicious actors. In this regard, the ML model may be a pre-trained model that is developed remotely from the storage drive to be monitored. In other examples, the training data used for generating the ML model may be taken from actual drive operation such that the generating operation 402 may occur locally at a drive to be monitored.

The operations 402 also include a storing operation 404 in which the ML model is stored in a local memory of the storage drive to be monitored. In the case where the ML model is a pre-trained ML model, the storing operation 404 may occur prior to the storage drive being put into service. Alternatively, if the ML model is generated in the generating operation 402 locally at the storage drive to be monitored, the ML model may be stored in the storing operation 404 concurrently with the operation of the storage drive to be monitored.

The operations 400 also include a receiving operation 406 in which commands are received at a storage controller of a drive. As described above, the commands may include I/O commands for read, write, and/or erase commands to be performed at the storage drive to be monitored. The commands may be received from a host device or from a system controller in the context in which a storage system includes a number of storage drives.

The operations 400 also include an executing operation 408 in which the commands received in the receiving operation 406 are executed on the storage media of the drive. For example, the executing operation 408 may include performing a read, write, and/or erase operation on the storage media of the storage drive to be monitored.

In addition, a writing operation 410 writes to a log of a local memory of the storage drive to be monitored. The data written to the log at least includes information regarding the commands received during the receiving operation 406 that are executed on the storage media in the executing operation 408. As can be appreciated, the data written to the log during the writing operation 410 may generally correspond to the commands executed on the storage media during the executing operation 408. As such, the operations 400 include the "T-ed" configuration described above in which commands are both executed on the storage media and written into a log on the local memory. The executing operation 408 and the writing operation 410 may be but are not required to be, performed concurrently. In other examples, the writing operation 410 may occur in an at least partially non-overlapping time period in which the executing operation 408 occurs. Further still, the writing operation 410 and the executing operation 408 may occur sequentially in any appropriate order.

Further still, the writing operation 410 may include writing additional information regarding the commands into the log. In this regard, the log may contain data regarding one or more logical block addresses (LBAs) that are subject to a command, a command sequence, memory access patters of the storage media, security command usage (e.g., PIN modification or initialization, band geometry changes, cryptographic erase, etc.), and/or physical parameters of the drive (e.g., temperature). Thus, the log may at least include data regarding the commands but may also include other operational data regarding the operation of the storage drive to be monitored, including the commands.

The operations 400 also includes accessing the log with an AI processor core of the storage device to be monitored in an accessing operation 412. Furthermore, an analysis operation 414 in which the AI processor core utilizes an ML model to analyze the data in the log is performed by the AI processor core. This may include the application of an RNN or other AI analysis that utilizes the ML model to identify an anomaly. The AI processor core may perform the analysis operation 414 in real-time as data is being written to the log such that storage drive performance may be continually monitored during the operation thereof.

In the event that an anomaly is detected during the analysis operation 414, a notifying operation 416 may be performed by the AI processor core. The notifying operation 416 may include communication of the occurrence of an anomaly to a remote location from the storage drive. This may include a communication to a host, a system controller, and/or another remote device or entity (e.g., a security analyst or the like). The notification may be based on an output of the analysis operation 414. In this regard, it may be appreciated that the output of the analysis operation 414 need not be a binary determination that an anomaly has occurred or has not occurred. For example, the analysis operation 414 may include a determination regarding a probability that certain operations are anomalous on a given storage drive. For example, the analysis may indicate that a given operation has a 45% probability of being an anomaly. In this regard, the notifying operation 416 may include the application of filtering or a threshold to determine whether an output of the analysis operation 414 triggers a notification.

As described above, what operational conditions define "normal" operations of a drive is largely dependent on the context in which the drive is used. Furthermore, malicious attacks on a drive may be according to a wide variety of approaches that cannot accurately be predicted with certainty. Accordingly, it should be understood that an anomaly in relation to the operation of a drive may be widely varied. In turn, while one specific scenario is described below in relation to one example of anomaly detection in a surveillance HDD system, this example is to be illustrative and not limiting.

Figure 5:
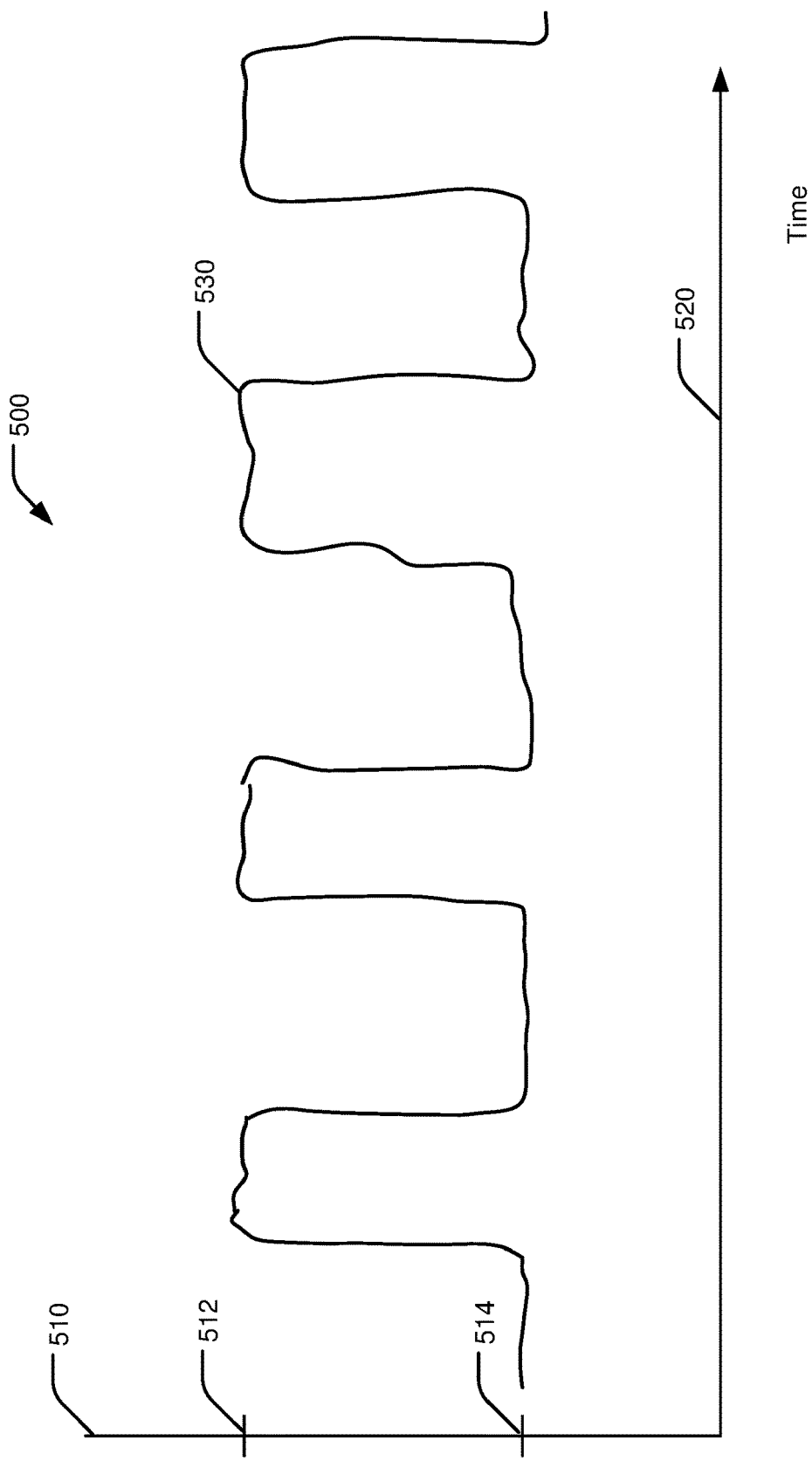
FIGS. 5-7 illustrate various example operations of a storage drive in a surveillance HDD system that may be monitored by an AI processor core of the drive.

FIG. 5 illustrates an example of a chart 500 showing the operation of an HDD in a surveillance HDD system in which video data is written to the HDD. Specifically, the chart 500 includes a depiction of a plot indicative of data writes 530. The vertical axis 510 of the chart 500 relates to the physical address in the HDD to which data is written. The horizontal axis 520 relates to time. As can be appreciated, in the system, a repeating, regular stream of data is written to the HDD. A video stream (e.g., of a given duration) may be streamed to the system continuously. These portions of data may be written in a first physical address region 514 of the drive (e.g., an outer diameter of the HDD drive). Another segment of data comprising metadata regarding the video stream may be stored in a second physical address region 512 of the drive (e.g., an inner diameter of the HDD drive). Because the video stream is continuously written to the HDD, the regular, alternating pattern of data being written to the first physical address region 514 and to the second physical address region 512 may constitute normal or nominal writing operations for the drive. The solid line is used to illustrate data writes 530.

Figure 6:
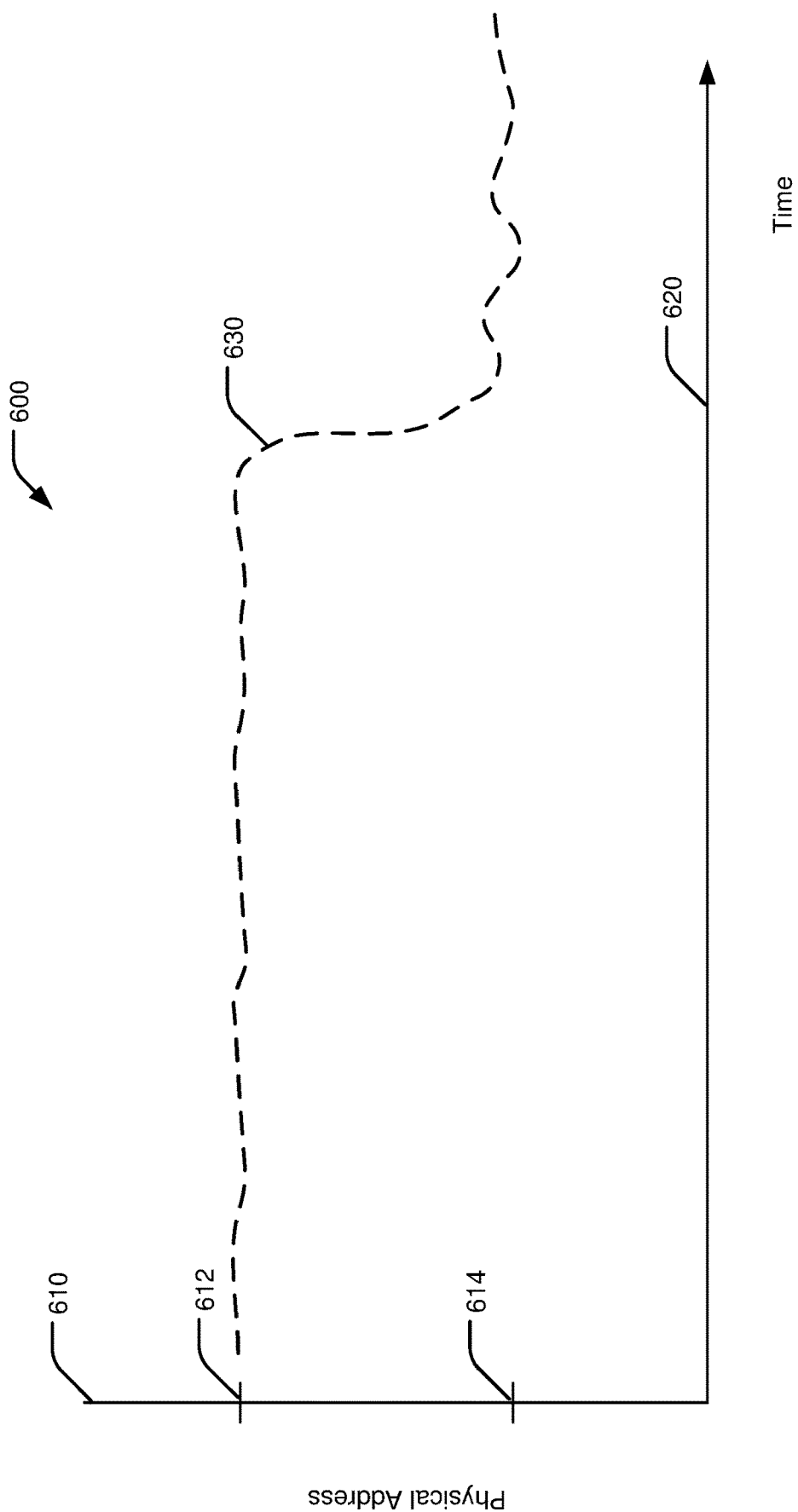

FIG. 6 illustrates another chart 600, illustrating read operations in the surveillance HDD system. In FIG. 6, read operations 630 are reflected in chart 600 in which the vertical axis 610 represents physical addresses of the HDD and the horizontal axis 620 represents time. When a user searches for a portion of video from the system, the system may read physical addresses in the second physical address region 512 corresponding to the metadata of the video to search for a desired portion of the video stream. Once located, the read operation 630 may begin to address the first physical address region 514 to play the located video stream from the HDD. In this regard, the dotted line represents the read operations 630.

Figure 7:
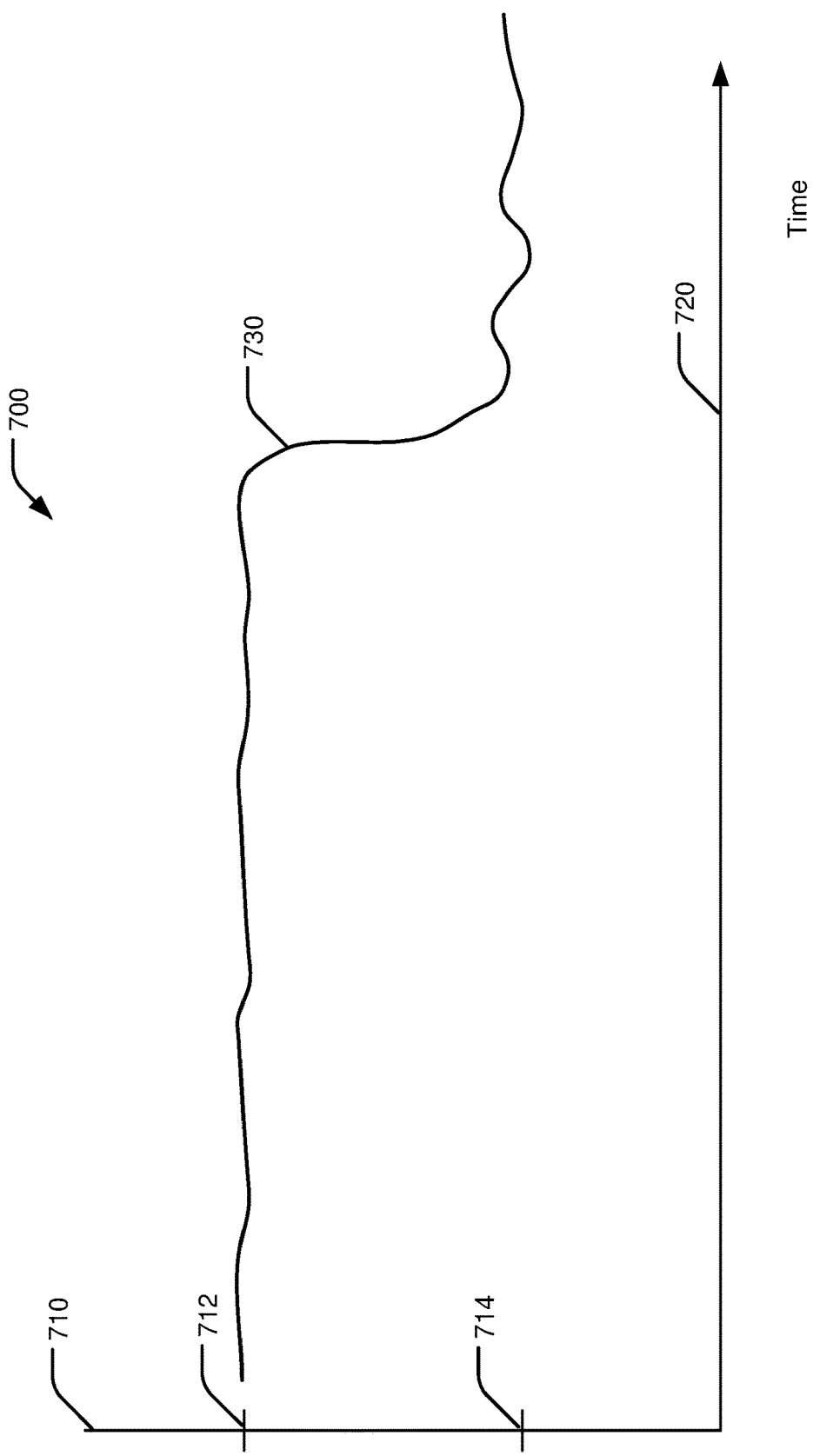

FIG. 7 illustrates another plot 700 related to the operation of the surveillance HDD system. In this plot, a solid line illustrating data writes 730 shows continuous writing to the second physical address region 712 of the HDD without updating the video stream in the first physical address region 714 as would be expected from the operations depicted in chart 500 of FIG. 5. In this regard, the operations depicted in FIG. 7 may be malicious activities designed to overwrite metadata of the system. This may be flagged as an anomaly even though it follows the pattern of FIG. 6 related to a search for video because the operations are write commands rather than read commands. Accordingly, the operations of FIG. 7 may be flagged as anomalous.

Figure 8:
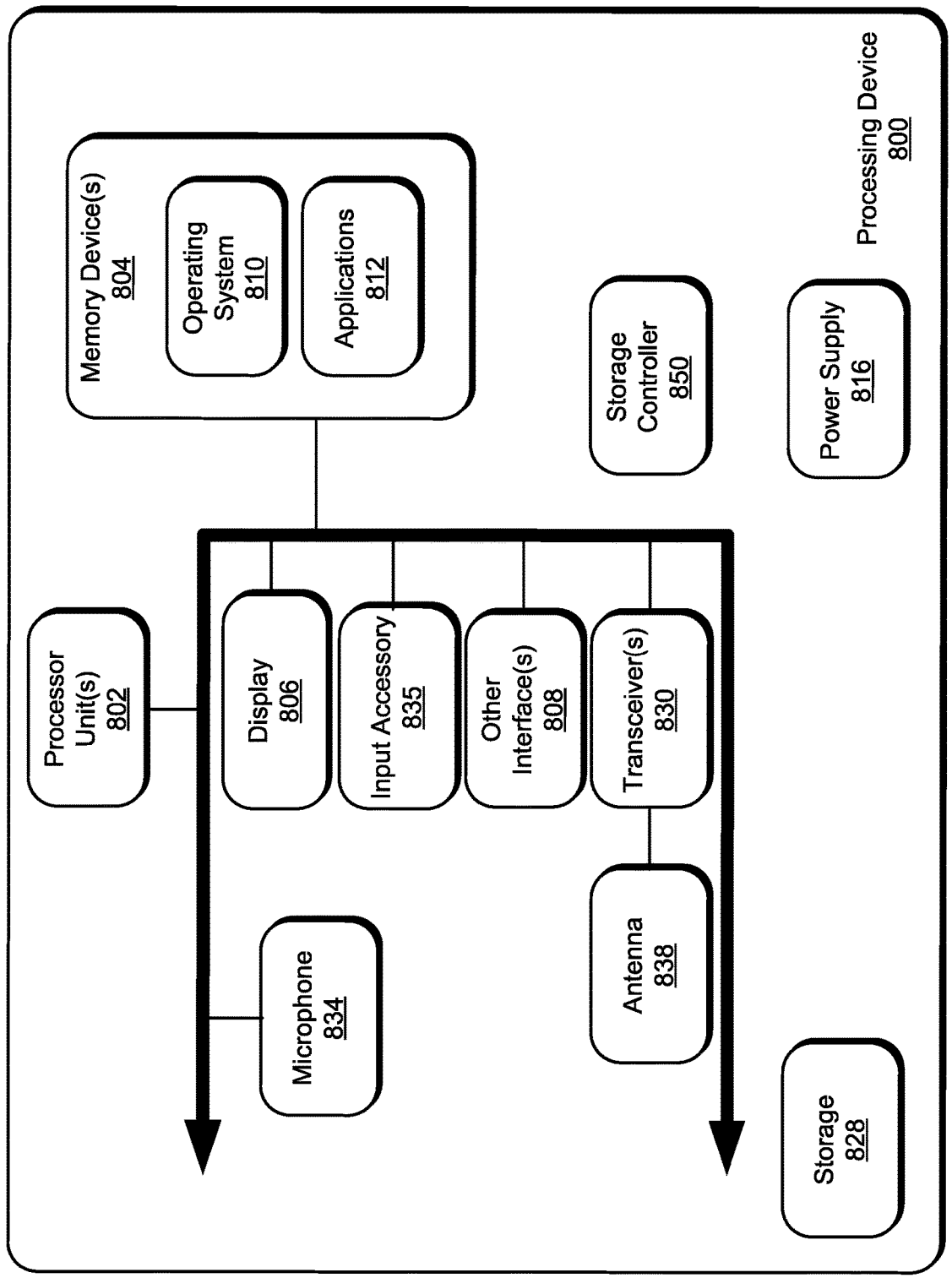
FIG. 8 illustrates an example processing system for execution of aspects of the present disclosure.

FIG. 8 illustrates an example schematic of a processing system 800 suitable for implementing aspects of the disclosed technology, including a storage controller 850. The processing system 800 includes one or more processor unit(s) 802, memory 804, a display 806, and other interfaces 808 (e.g., buttons). The memory 804 generally includes both volatile memory (e.g., RAM) and non-volatile memory (e.g., flash memory). An operating system 810, such as the Microsoft Windows® operating system, the Apple macOS operating system, the Linux operating system, or a UNIX operating system, resides in the memory 804 and is executed by the processor unit(s) 802, although it should be understood that other operating systems may be employed.

One or more applications 812 are loaded in the memory 804 and executed on the operating system 810 by the processor unit(s) 802. Applications 812 may receive input from various input local devices such as a microphone 834, input accessory 835 (e.g., keypad, mouse, stylus, touchpad, joystick, an instrument mounted input, or the like). Additionally, the applications 812 may receive input from one or more remote devices such as remotely-located smart devices by communicating with such devices over a wired or wireless network using more communication transceivers 830 and an antenna 838 to provide network connectivity (e.g., a mobile phone network, Wi-Fi®, Bluetooth®). The processing device 800 may also include various other components, such as a positioning system (e.g., a global positioning satellite transceiver), one or more accelerometers, one or more cameras, an audio interface (e.g., the microphone 834, an audio amplifier and speaker and/or audio jack), and storage devices 828. Other configurations may also be employed.

The processing system 800 further includes a power supply 816, which is powered by one or more batteries or other power sources and which provides power to other components of the processing system 800. The power supply 816 may also be connected to an external power source (not shown) that overrides or recharges the built-in batteries or other power sources.

In an example implementation, a display system may include hardware and/or software embodied by instructions stored in the memory 804 and/or the storage devices 828 and processed by the processor unit(s) 802. The memory 804 may be the memory of a host device or of an accessory that couples to the host.

The processing system 800 may include a variety of tangible processor-readable storage media and intangible processor-readable communication signals. Tangible processor-readable storage can be embodied by any available media that can be accessed by the processing system 800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled, and/or interpreted programming language.

One general aspect of the present disclosure includes a method for anomaly monitoring in a storage drive in a storage device. The method includes receiving input/output (I/O) commands at a storage controller of the storage drive. The storage controller is located locally on the storage drive. The method includes executing the I/O commands on the storage drive using the storage controller and writing a log regarding operations of the storage drive at least including the I/O commands into a local memory of the storage drive. In turn, the method includes accessing the log with an artificial intelligence (AI) processor core to execute an AI analysis on the log to monitor for an anomaly related to the operations of the storage drive, the AI processor core located locally to the storage drive.

Implementations may include one or more of the following features. In an example, the AI processor core is securely isolated from the storage controller. For example, the storage controller may include a plurality of processor cores, and the AI processor core may be a dedicated one of the plurality of processor cores of the storage controller.

In an example, the AI processor core is operative to access a pre-trained machine learning (ML) model in the local memory of the storage drive. The pre-trained ML model may be configured in particular relation to a context of operation of the storage device.

The method may be performed independently at each respective storage drive of the storage device to monitor for an anomaly regarding activity at each respective storage drive. In this regard, monitoring for an anomaly may occur locally at each respective storage drive. In one example, the writing operation includes writing the log in a circular buffer of the local memory of the storage device.

Another general aspect of the present disclosure includes a storage drive with anomaly monitoring. The storage drive includes a storage controller operative to receive and execute I/O commands on the storage drive. The storage drive also includes a local memory, including a log regarding operations of the storage drive at least including the I/O commands. The log is written to the local memory by the storage controller jointly with the execution of the I/O commands by the storage controller. The storage drive also includes an artificial intelligence (AI) processor core operative to access the log from the local memory and execute an AI analysis on the log to monitor for an anomaly related to the operations of the storage drive.

Implementations may include one or more of the following features. For example, the AI processor core may be securely isolated from the storage controller. Specifically, in at least one example of the storage drive, the storage controller includes a plurality of processor cores, and the AI processor core is a dedicated one of the plurality of processor cores of the storage controller.

In an example, the local memory further includes a pre-trained machine learning (ML) model and the AI processor core is operative to access the ML model from the local memory of the storage drive. The ML model may be configured in particular relation to a context of operation of the storage drive. The writing operation may include writing the log in a circular buffer of the local memory of the storage drive.

In another example, a storage device is provided that includes a plurality of storage drives according to any of the foregoing description. Each of the plurality of storage drives independently monitors for an anomaly at each respective storage drive of the plurality of storage drives regarding activity at each respective storage drive.

Another general aspect of the present disclosure includes one or more tangible processor-readable storage media embodied with instructions for executing on one or more processors and circuits of a device a process for anomaly monitoring in a storage drive. The process embodied in the instructions includes receiving I/O commands at a storage controller of the storage drive, where the storage controller is located locally to the storage drive. The process also includes executing the I/O commands on the storage drive using the storage controller and writing a log regarding operations of the storage drive, at least including the I/O commands into a local memory of the storage drive. The process further includes accessing the log with an artificial intelligence (AI) processor core to execute an AI analysis on the log to monitor for an anomaly related to the operations of the storage drive. The AI processor core is located locally to the storage drive.

Implementations may include one or more of the following features. For example, the AI processor core may be securely isolated from the storage controller. In one specific example, the storage controller includes a plurality of processor cores, and the AI processor core comprises a dedicated one of the plurality of processor cores of the storage controller.

In an example, the AI processor core is operative to access a pre-trained machine learning (ML) model in the local memory of the storage drive. The pre-trained ML model may be configured in particular relation to a context of operation of the storage drive.

In an example, the method may be performed independently at each respective storage drive of the storage drive to monitor for an anomaly regarding activity at each respective storage drive. In addition, the writing operation includes writing the log in a circular buffer of the local memory of the storage drive.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

What is claimed is:

1. A method for anomaly monitoring in a storage drive in a storage device, comprising:
   receiving I/O commands at a storage controller of the storage drive, the storage controller located locally to the storage drive;
   executing the I/O commands on the storage drive using the storage controller;
   writing a log regarding operations of the storage drive at least including the I/O commands into a local memory of the storage drive; and
   accessing the log with an artificial intelligence (AI) processor core to execute an AI analysis on the log to monitor for an anomaly related to the operations of the storage drive, the AI processor core located locally to the storage drive and is securely isolated from the storage controller.

2. The method of claim 1, wherein the storage controller comprises a plurality of processor cores, and the AI processor core comprises a dedicated one of the plurality of processor cores of the storage controller.

3. The method of claim 1, wherein the AI processor core is operative to access a pre-trained machine learning (ML) model in the local memory of the storage drive.

4. The method of claim 3, wherein the pre-trained ML model is configured in particular relation to a context of operation of the storage device.

5. The method of claim 1, wherein the method is performed independently at each respective storage drive of the storage device to monitor for an anomaly regarding activity at each respective storage drive.

6. The method of claim 1, wherein the writing operation includes writing the log in a circular buffer of the local memory of the storage device.

7. A storage drive with anomaly monitoring, comprising:
   a storage controller located locally at the storage drive and operative to receive and execute I/O commands on the storage drive;
   a local memory including a log regarding operations of the storage drive at least including the I/O commands, the log is written to the local memory by the storage controller jointly with the execution of the I/O commands by the storage controller; and
   an artificial intelligence (AI) processor core located locally at the storage drive and securely isolated from the storage controller, the AI processor core being operative to access the log from the local memory and execute an AI analysis on the log to monitor for an anomaly related to the operations of the storage drive.

8. The storage drive of claim 7, wherein the storage controller comprises a plurality of processor cores, and the AI processor core comprises a dedicated one of the plurality of processor cores of the storage controller.

9. The storage drive of claim 7, wherein the local memory further includes a pre-trained machine learning (ML) model, and the AI processor core is operative to access the ML model from the local memory of the storage drive.

10. The storage drive of claim 9, wherein the ML model is configured in particular relation to a context of operation of the storage drive.

11. The storage drive of claim 7, wherein the writing operation includes writing the log in a circular buffer of the local memory of the storage drive.

12. A storage device, comprising:
   a plurality of storage drives according to claim 7;
   wherein each of the plurality of storage drives independently monitors for an anomaly at each respective storage drive of the plurality of storage drives regarding activity at each respective storage drive.

13. One or more tangible processor-readable storage media embodied with instructions for executing on one or more processors and circuits of a device a process for anomaly monitoring in a storage drive, the process comprising:
   receiving I/O commands at a storage controller of the storage drive, the storage controller located locally to the storage drive;
   executing the I/O commands on the storage drive using the storage controller;
   writing a log regarding operations of the storage drive at least including the I/O commands into a local memory of the storage drive; and
   accessing the log with an artificial intelligence (AI) processor core to execute an AI analysis on the log to monitor for an anomaly related to the operations of the storage drive, the AI processor core located locally to the storage drive and is securely isolated from the storage controller.

14. The one or more tangible processor-readable storage media of claim 13, wherein the storage controller comprises a plurality of processor cores, and the AI processor core comprises a dedicated one of the plurality of processor cores of the storage controller.

15. The one or more tangible processor-readable storage media of claim 13, wherein the AI processor core is operative to access a pre-trained machine learning (ML) model in the local memory of the storage drive, the pre-trained ML model being configured in particular relation to a context of operation of the storage drive.

16. The one or more tangible processor-readable storage media of claim 13, wherein the method is performed independently at each respective storage drive of the storage drive to monitor for an anomaly regarding activity at each respective storage drive.

17. The one or more tangible processor-readable storage media of claim 13, wherein the writing operation include writing the log in a circular buffer of the local memory of the storage drive.

* * * * *